(12) United States Patent
Hager et al.

(10) Patent No.: US 7,129,830 B2
(45) Date of Patent: Oct. 31, 2006

(54) METHODS AND SYSTEMS FOR PROVIDING SECURITY

(75) Inventors: James R. Hager, Golden Valley, MN (US); Steven H. Thomas, Minneapolis, MN (US)

(73) Assignee: Honeywell International Inc., Morristown, NJ (US)

(*) Notice: Subject to any disclaimer, the term of this patent is extended or adjusted under 35 U.S.C. 154(b) by 11 days.

(21) Appl. No.: 10/987,595

(22) Filed: Nov. 12, 2004

(65) Prior Publication Data

US 2006/0116837 A1    Jun. 1, 2006

(51) Int. Cl.
*G08B 23/00* (2006.01)

(52) U.S. Cl. ............... 340/500; 340/506; 340/539.13; 340/988; 340/524; 340/525; 342/118.1; 342/126; 701/214; 701/215

(58) Field of Classification Search ............ 340/500, 340/539.13, 988, 524, 525, 506; 342/118, 342/126, 118.1; 701/200, 215, 214, 125
See application file for complete search history.

(56) References Cited

U.S. PATENT DOCUMENTS

| | | | |
|---|---|---|---|
| 4,742,336 A | 5/1988 | Hall et al. | |
| 5,093,650 A | 3/1992 | Kolbatz | |
| 5,117,223 A | 5/1992 | Tanner | |
| 5,200,735 A | 4/1993 | Hines | |
| 5,257,007 A | 10/1993 | Steil et al. | |
| 5,319,698 A | 6/1994 | Glidewell et al. | |
| 5,440,292 A | 8/1995 | Bedrosian | |
| 5,552,772 A * | 9/1996 | Janky et al. | 340/573.4 |
| 5,587,701 A | 12/1996 | Hess | |
| 5,777,551 A | 7/1998 | Hess | |
| 5,850,180 A | 12/1998 | Hess | |
| 6,049,273 A | 4/2000 | Hess | |
| 6,415,646 B1 * | 7/2002 | Kessel et al. | 73/23.2 |
| 6,831,557 B1 | 12/2004 | Hess | |
| 6,944,542 B1 * | 9/2005 | Eschenbach | 701/220 |
| 2005/0174235 A1 * | 8/2005 | Davis et al. | 340/539.13 |

* cited by examiner

*Primary Examiner*—Tai Nguyen
(74) *Attorney, Agent, or Firm*—Dina Khaled, Esq.; Armstrong Teasdale LLP

(57) ABSTRACT

A security system is described which includes a base station, at least one calibration unit and at least one sensor module having at least one sensor therein. The calibration unit is configured to provide signals to the at least one sensor module. The signals contain data configured to at least partially enable each sensor module to determine its location within a coordinate system. Each sensor module is further configured to transmit module location data, module orientation data, and sensor status from each sensor to the base station.

24 Claims, 3 Drawing Sheets

METHODS AND SYSTEMS FOR PROVIDING SECURITY

BACKGROUND OF THE INVENTION

This invention relates generally to security systems, and more specifically, to a multifunctional security system for defined areas.

Security systems are widely used to protect property and provide personal safety. Generally, such security systems provide the protection by generating an alarm in response to one or more events, for example, an unauthorized entry, a fire, a medical emergency or a manual alarm activation. Some security systems are remotely monitored. If such a security system generates an alarm, an alarm notification signal is transmitted to a central station. Upon receiving the alarm notification signal, security service personnel at the central station respond appropriately, for example, by contacting a party at the secured location to verify the alarm or by contacting an appropriate entity. If it is appropriate to do so, the security service personnel may, upon confirmation of the alarm, contact an emergency response agency (e.g., the police department, the fire department or an emergency medical team).

However, such security systems are limited in scope to providing security to a well defined area, for example, a building or cluster of buildings. These security systems also may be utilized to provide security to an outdoor area. However, these security systems are intended to be a part of a substantially permanent installation. A need still exists for a security system that is portable and rapidly deployable which still provides the functionality of the above described security systems.

BRIEF SUMMARY OF THE INVENTION

In one aspect, a security system is provided which comprises a base station, at least one calibration unit and at least one sensor module comprising at least one sensor. Each calibration unit is configured to provide signals to the at least one sensor module. The signals contain data configured to at least partially enable the at least one sensor module to determine its location within a coordinate system. The at least one sensor module is further configured to transmit module location data, module orientation data, and sensor status from the at least one sensor to the base station.

In another aspect, a sensor module for a security system is provided. The sensor module comprises at least one sensor configured to provide a status, and a receiver configured to receive at least a plurality of GPS derived locations and times of transmission from a plurality of calibration unit locations. The sensor further comprises a processor programmed to calculate a position of the sensor module based on the received plurality of GPS derived locations and times of transmission and a transmitter configured to transmit the status from the sensors and the calculated position from the processor.

In still another aspect, a method for providing security to an area utilizing a plurality of sensor modules is provided. The method comprises providing sensor modules each including at least one sensor therein to be dispersed within the area to be monitored and providing a plurality of calibration units to be dispersed within a vicinity of the sensor modules. The method also comprises configuring the calibration units to derive and transmit their GPS location and a time of transmission to the sensor modules, programming the sensor modules to calculate their location based on the signals and times of transmission received from the calibration units, and further programming the sensor modules to transmit their location and a status from the at least one sensor therein.

DETAILED DESCRIPTION OF THE INVENTION

Figure 1:
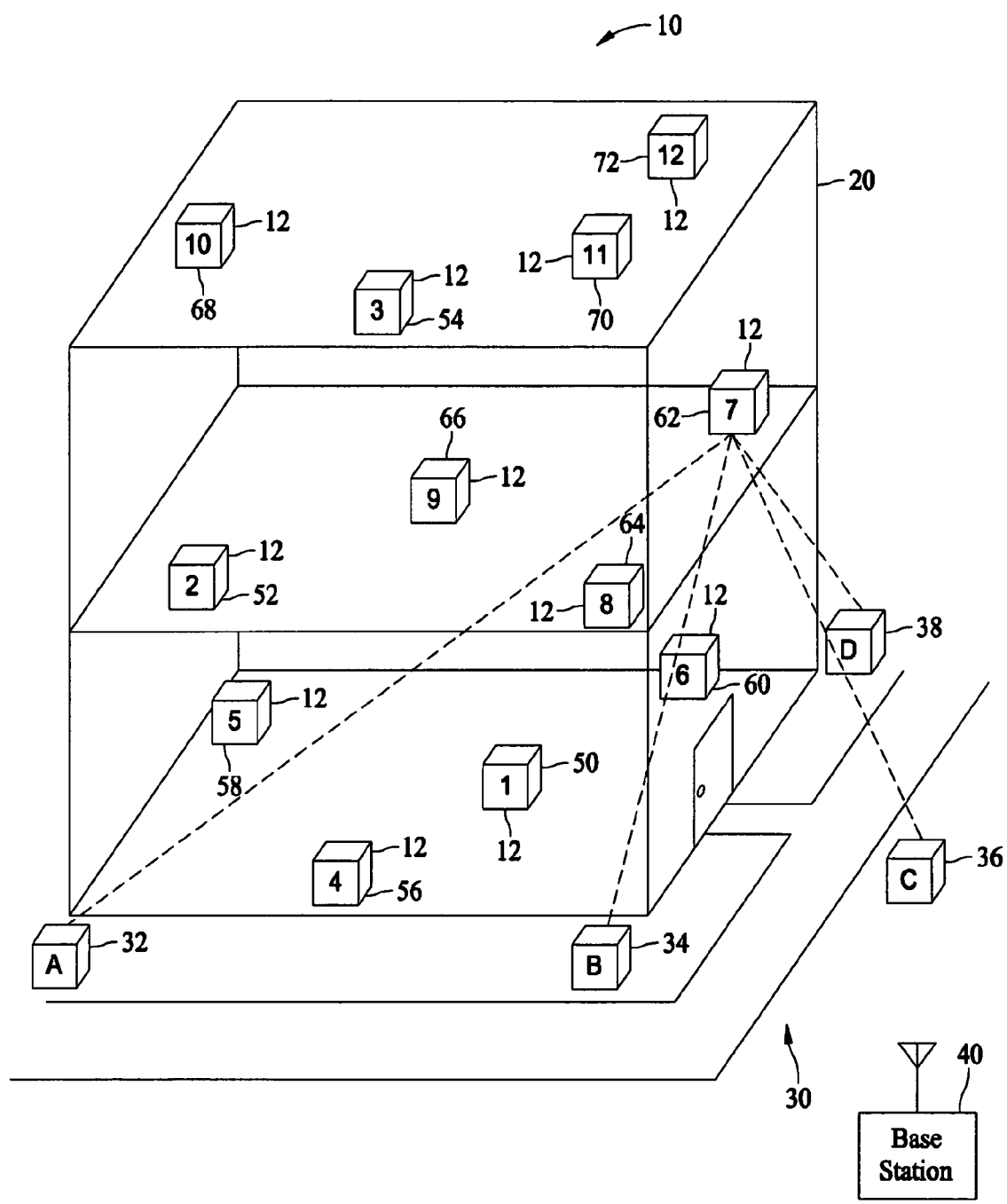
FIG. 1 is a diagram of a security system including a plurality of sensor modules, calibration units and a base station.

FIG. 1 illustrates an embodiment of a security system 10 which provides a capability for placing one or more multifunctional security sensor modules 12 within a building 20. While described herein in terms of building 20, it is to be understood that security system 10 is operable within other defined areas and for other uses, for example, within a battle field area, within an airport tarmac area, for the purpose of surveillance, for utilization as an intrusion alarm, for intelligence gathering, and detection of one or more of smoke, fire, and gas. Security system 10, as further described below, is configured to be portable and rapidly deployable for a variety of applications.

In the embodiment illustrated, security system 10 further is a four unit/four position calibration system that includes individual calibration units 32, 34, 36, and 38. In the embodiment illustrated, calibration units 32, 34, 36, 38 are all located external to building 20, but in alternative embodiments, one or more of such units may be within building 20. Calibration of security sensor modules 12 to determine their location within a coordinate system and set their internal clock is accomplished with separate calibration units, as illustrated. Alternatively the calibration may be accomplished with fewer calibration units that are transported to different locations during the calibration process. As an example, a one calibration unit/four position calibration of security sensor modules 12 is contemplated. Security system 10 includes a base station 40 which is configured to receive communications from sensor modules 12 as further described below. While referred to collectively as security sensor modules 12, individual security sensor modules within building 20 are labeled as 50, 52, 54, 56, 58, 60, 62, 64, 66, 68, 70, and 72 respectively. While all security sensor modules are shown as being within building 20, it is to be understood that a number of security sensor modules may be deployed external to building 20.

Figure 2:
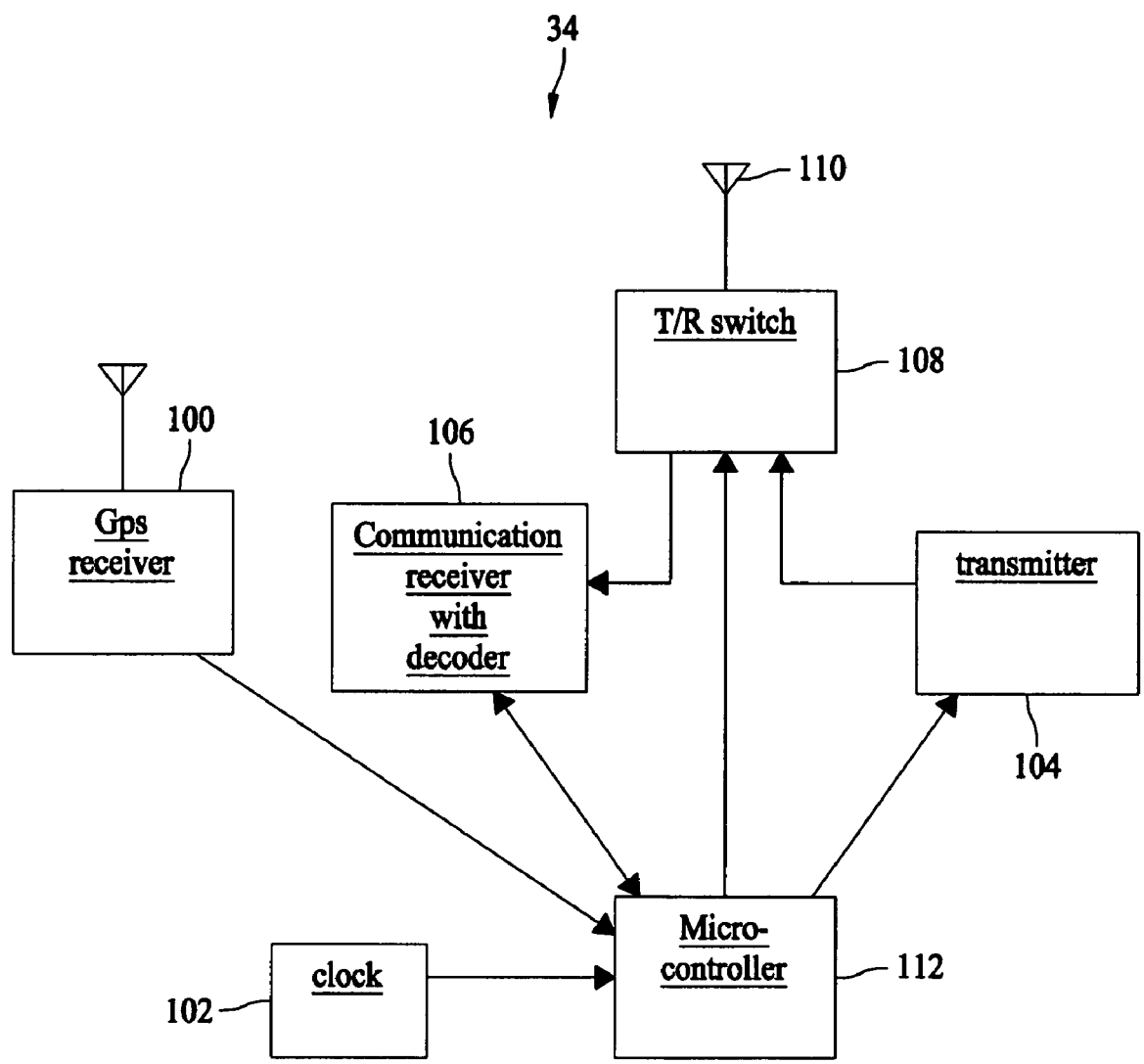
FIG. 2 is a block diagram of a calibration unit.

FIG. 2 is a block diagram of calibration unit 34 which is representative of all the calibration units within security system 10. Each calibration unit 32, 34, 36, and 38 includes a GPS location receiver 100, an accurate clock 102, a transmitter 104, and a communications receiver with decoder 106 to receive position transmissions from the other calibration units. Calibration unit 34 further includes a transmit receive switch 108 allowing transmitter 104 and receiver 106 to share a single antenna 110 for respective transmissions and receptions Operation of calibration unit 34 is controlled by a micro-controller 112 or other processor. Micro-controller 112 is configured to receive data from receiver 106 and provide data for transmission by transmitter 104 including at least an identification for calibration unit 34, along with its position as received from GPS receiver 100, and a time of transmission, as further described below. With respect to data received from receiver 106, such data, for example, includes messages from other calibration units providing their location information. Micro-controller 112 is at least partially configured to utilize such information in determining its own three-dimensional location.

One example of accurate clock 102 is an atomic clock. GPS location receiver 100 provides calibration unit 34 with a capability to determine its location within a three dimensional coordinate system, based on signals received from a plurality of GPS satellites. After determining its three dimensional location within the coordinate system, each individual calibration unit (32, 34, 36, and 38) is configured to transmit a GPS derived location and time of transmission utilizing its respective transmitter 104.

In embodiments that incorporate more than one calibration unit, the calibration units are configured to transmit the GPS derived location and transmission time sequentially, one calibration unit after another, utilizing their respective transmitters 104. In one embodiment, the timing of the sequential transmissions is programmable by a user(s), that is, the calibration units are preprogrammed with a known sequence, for example calibration unit 36 first, calibration unit 38 second, calibration unit 34 third, and calibration unit 32 fourth.

For example, in the above described programmable sequence, all calibration units 32, 34, 36, and 38 are powered on at approximately the same time. In the example, calibration unit 36 is configured to determine its position utilizing GPS. After calibration unit 36 determines its position, it transmits a message, received by calibration units 32, 34, and 38, which includes its position. After receiving this message, calibration unit 38 determines its position utilizing GPS, and transmits a message which includes its position to be received by calibration units 32, 34, and 36. Calibration unit 34 and calibration unit 32, in order, determine and transmit their position.

GPS location receiver 100 is configured to provide time updates to clock 102 through micro-controller 112. In one embodiment, transmitter 104 is configured to transmit signals at a frequency, for example, from about 20 kHz to about 100 kHz that allows for straight-line penetration of the transmitted signals through obstructions such as walls and trees for reception of the transmitted signals by one or more security sensor modules 12 (shown in FIG. 1) and other calibration units.

Figure 3:
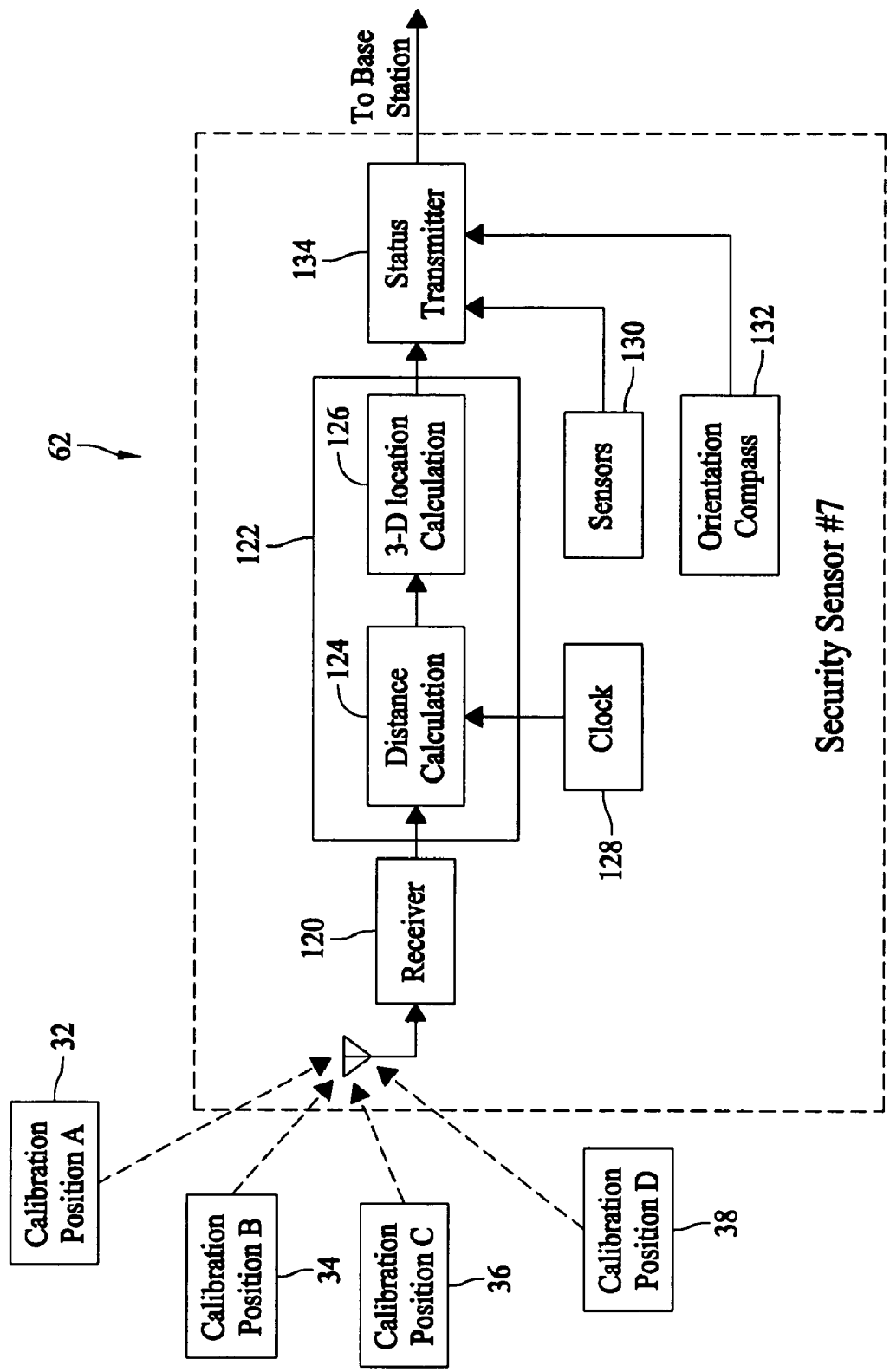
FIG. 3 is a block diagram of a sensor module.

FIG. 3 is a block diagram of security sensor module 62. While described herein in terms of security sensor module 62, it is understood that the description herein is applicable to each security sensor module 12 included within a security system such as security system 10. Now referring to FIG. 3, security sensor module 62 includes a receiver 120 configured similarly to a GPS receiver, but having an operational frequency, for example, from about 20 kHz to about 100 kHz, that allows for reception of signals through obstructions such as walls and trees as described above.

Security sensor module 62 is configured with a processor 122 that is programmed with a distance calculation program 124 and a three-dimensional location program 126. Distance calculation program 124 is configured to cause determination of a distance between sensor module 62 and each calibration unit 32, 34, 36, and 38 at least in part by determining an elapsed time from a signal transmission from a calibration unit (i.e., calibration units 32, 34, 36, and 38) to reception of that transmission by sensor module 62. The elapsed time is the subtraction of a time of transmission embedded within the signals received from a respective calibration unit from the reception time as determined by sensor module 62 as determined utilizing clock 128.

Three-dimensional location program 126 is configured to determine a three-dimensional position within a coordinate system for security sensor module 62. Three-dimensional location program 126 utilizes location data embedded within the signals transmitted from the calibration units (i.e., calibration units 32, 34, 36, and 38 (also shown in FIG. 1)) and the calculated distance from the respective calibration unit. The three-dimensional position is calculated based on location data from multiple calibration unit locations and the distance calculation output from distance calculation program 124, which results, in one embodiment, in three equations having three unknown variables. In the equations, some of the distances are derived from a time of travel between a transmitter of one calibration unit and a receiver of another calibration unit or security sensor module (approximately one foot per nanosecond).

Three-dimensional location program 126 is similar in some respects to the triangulation utilized by GPS systems to determine a position based on a known and fixed location of satellites. Specifically, three-dimensional location program 126 determines distances using the travel time of received signals from the various calibration units. To measure the travel time of received signals, very accurate timing is needed. By using a distance measurement to a fourth calibration unit location, any clock inaccuracies within clock 128 can be eliminated.

A two dimensional example is provided to better illustrate operation of three-dimensional location program 126. For example, if the location of sensor module 62 is four seconds from calibration unit 32 and six seconds from calibration unit 34. These two distances would be represented by circles intersecting at the position of sensor module 62, referred to as position A. Position A would be the position provided by sensor module 62 if it had the highly accurate atomic clock. However, if the clock of sensor module 62 is one second slow compared to the clocks within calibration units 32 and 34, sensor module 62 would indicate that the distance to calibration unit 32 is five seconds instead of four, and the distance to calibration unit 43 would appear to be seven seconds. This error causes the circles to intersect at a different point, B. Therefore, the difference between A and B is the clock error of clock 128 within sensor module 62.

With a clock error of clock 128, the circle representing the travel time from a third calibration unit, for example, calibration unit 36, would not intersect at point B. Therefore processor 122 is programmed to determine a single correction factor that would allow all the measurements to intersect at one point. In the provided example, processor 122 determines that by subtracting one second from each measurement, the range circles would all intersect at one point. With this calculated correction factor, processor 122 applies the correction factor to all measurements. This correction process is periodically repeated to make sure clocks 128 in the various sensor units are synchronized.

After sensor modules 12 are distributed throughout a surveillance site, for example, a building, an airport tarmac, or other area, one or more calibration units, for example, calibration units 32, 34, 36, and 38 are brought to the site and positioned apart from one another. Each individual calibration unit is then enabled to determine its position within a coordinate system utilizing GPS as described above. Once each calibration unit has determined its position, for example, calibration units 32, 34, 36, and 38, the calibration units begin to transmit signals which are received by sensor modules 12. Reception of the signals from the calibration units provides sensor modules 12, at least in part, with a capability to precisely locate themselves within the three dimensional coordinate system and correct for sensor clock errors as above described.

However, in order to control an expense of sensor modules 12, an atomic clock within each one is not practical. Therefore, as described above, sensor modules 12 will typically be configured with an inexpensive crystal clock. As a result, when determining a position of sensor modules 12 utilizing transmissions from the multiple calibration units 32, 34, 36, and 38, there is a fourth unknown in addition to the as yet undetermined three coordinate position of the respective sensor module 12, and that unknown is the sensor clock error. Utilization of the fourth calibration unit in determining a position of sensor modules 12, allows for a four equation, four unknown variable solution in determining the coordinate position of each individual sensor module 12 and correcting sensor clock errors used in determining a distance between a transmitting calibration unit (i.e., calibration units 32, 34, 36, and 38) and a receiving security sensor module 12.

For a three dimensional location and sensor clock error solution for determining distance, four calibration positions are needed. To provide such a solution, either four calibration units, for example calibration units 32, 34, 36, and 38 are utilized, or a single calibration unit, is utilized at three or four separate locations. Other combinations of calibration units and locations are possible. Utilization of a fourth calibration position is utilized to remove any errors in distance determination due to errors in sensor clock 128 as described above.

Once these position calibration steps have completed, and positions of each sensor module 12 determined, the calibration units may be removed from the surveillance area. After calibration, each sensor module 12 is capable of transmitting status updates which include sensed data from sensors 130, a sensor module location, and a sensor module orientation for the particular sensor module 12 to base station 40 (shown in FIG. 1) from which the surveillance area covered by the dispersed sensor modules 12 is monitored and appropriate response actions initiated.

Sensors 130 within security sensor module 62 are representative of one or more individual sensors utilized for determining the presence of audio, video, vibration, smoke, fire, and gas, for example. An orientation compass 132 within security sensor module 62 is configured to provide a compass orientation of sensors 130 within sensor module 62 to status transmitter 134. Status transmitter 134 receives inputs from the various sensors 130, distance calculation program 124 and three-dimensional location program 126. Status transmitter 134 also transmits sensed data, sensor module location, and sensor module orientation to base station 40 (shown in FIG. 1) where the contents of such a transmission can be interpreted by a user or through automation. It is to be understood that the description of sensor module 62 is by way of example only and is equally applicable to any of sensor modules 12, except that individual sensor modules may incorporate more or fewer of sensors 130. For example, sensor module 72 may only incorporate a smoke sensor, while sensor module 50 may be configured with audio, video and, vibration sensors.

Security system 10 provides a user with a highly adaptable portable security solution that provides highly accurate information based on the utilization of sensor modules 12 that transmit status conditions from sensors 130 within sensor modules 12 to base station 40. The information is highly accurate because sensor module positions are easily determined with one or more of the above described calibration units which incorporate GPS technology to determine their positions within a coordinate system. Based upon receptions from multiple calibration unit positions, the sensor modules 12 are subsequently able to determine their locations accurately, and convey that accurate location information as required to base station 40.

While the invention has been described in terms of various specific embodiments, those skilled in the art will recognize that the invention can be practiced with modification within the spirit and scope of the claims.

What is claimed is:

1. A security system comprising:
    a base station;
    at least one sensor module comprising at least one sensor and a processor; and
    at least one calibration unit, said calibration unit configured to transmit signals to be received by said at least one sensor module, said signals containing a plurality of GPS derived locations and times of transmission, said processor programmed to calculate a position of said sensor module within a three dimensional coordinate system utilizing said plurality of GPS derived locations and times of transmission, said at least one sensor module configured to transmit module location data, module orientation data, and sensor status from said at least one sensor to said base station.

2. A security system according to claim 1 wherein said at least one sensor comprises one or more of a smoke sensor, a fire sensor, a gas sensor, an audio sensor, a video sensor, and a vibration sensor.

3. A security system according to claim 1 wherein said at least one sensor module is configured to periodically transmit module location data, module orientation data, and sensor status utilizing a frequency from about 20 kHz to about 100 kHz.

4. A security system according to claim 1 wherein said at least one calibration unit is configured to:
    determine its location within a coordinate system utilizing GPS; and
    transmit a GPS derived location and a time of transmission.

5. A security system according to claim 1 wherein said at least one calibration unit comprises a clock, said clock configured to receive time updates based on GPS information received by said calibration unit.

6. A security system according to claim 1 wherein said at least one calibration unit comprises a first calibration unit and a second calibration unit, said first calibration unit configured to determine its location within a coordinate system utilizing GPS, said second calibration unit configured to receive a location of said first calibration unit from said first calibration unit, then determine its location within the coordinate system utilizing GPS.

7. A security system according to claim 6 wherein said first calibration unit and said second calibration unit are configured to sequentially transmit their location within the coordinate system, as derived from received GPS signals, and a time of transmission.

8. A security system according to claim 1 wherein said at least one sensor module comprises a clock, and wherein said processor is programmed with a distance calculation program configured to determine a distance between said sensor module and a respective said calibration unit, based upon a time of transmission received from the respective said calibration unit and a time provided by said clock.

9. A security system according to claim 1 wherein said processor is programmed with a three dimensional position program configured to determine a position of said sensor module based upon a GPS derived location received from the respective said calibration units.

10. A security system according to claim 1 wherein said at least one sensor module comprises an orientation compass configured to provide module orientation data to said processor.

11. A sensor module for a security system, said sensor module comprising:
   at least one sensor providing a status;
   a receiver configured to receive at least a plurality of GPS derived locations and times of transmission from a plurality of calibration unit locations;
   a processor programmed to calculate a position of said sensor module within a three dimensional coordinate system based on the received plurality of GPS derived locations and times of transmission; and
   a transmitter configured to transmit the status from said at least one sensor, module orientation data, and the calculated position from said processor.

12. A sensor module according to claim 11 further comprising a clock, said processor configured to determine a distance between said sensor module and a unit transmitting a time of transmission to said receiver utilizing a time from said clock.

13. A sensor module according to claim 12 wherein said processor is configured to determine a delay by subtracting the time of transmission from the time from said clock.

14. A sensor module according to claim 12 wherein said processor is configured to correct any errors in said clock based on receiving at least four OPS derived locations and times of transmission.

15. A sensor module according to claim 11 further comprising an orientation compass configured to determine an orientation of said sensor module, said transmitter configured to transmit the orientation of said sensor module.

16. A sensor module according to claim 15 wherein said transmitter is configured to periodically transmit status from said sensor, the calculated position of said sensor module, and the orientation of said sensor module.

17. A sensor module according to claim 11 wherein said sensor comprises at least one of a smoke sensor, a fire sensor, a gas sensor, an audio sensor, a video sensor, and a vibration sensor.

18. A method for providing security to an area utilizing a plurality of sensor modules, said method comprising:
   providing sensor modules each including at least one sensor therein to be dispersed within the area to be monitored, the sensor modules also including a processor;
   providing a plurality of calibration units to be dispersed within a vicinity of the sensor modules;
   configuring the calibration units to derive and transmit their GPS location and a time of transmission to the sensor modules;
   programming the processor of each sensor module to calculate a position of the sensor module within a three dimensional coordinate system based on the signals and times of transmission received from the calibration units; and
   further programming the sensor modules to transmit their location, module orientation data and a status from the at least one sensor therein.

19. A method according to claim 18 further comprising:
   providing the sensor modules with an orientation compass therein; and
   further programming the sensor modules to transmit their orientation along with their location and the status from the at least one sensor.

20. A method according to claim 18 wherein programming the processor of each sensor module to calculate a position of the sensor module comprises:
   configuring the sensor modules with a clock providing a time; and
   programming the processor of each sensor module to determine a delay time by comparing the time of transmission received from each calibration unit to a time provided by the clock.

21. A method according to claim 18 wherein programming the processor of each sensor module to calculate a position of the sensor module comprises:
   configuring the sensor modules with a clock providing a time;
   configuring the sensor modules to receive GPS locations and times of transmission from four calibration unit locations; and
   programming the processor of each sensor module to correct any errors in the clock based on the received GPS locations and times of transmission.

22. A method according to claim 18 wherein configuring the calibration units to derive and transmit their GPS location and a time of transmission to the sensor modules comprises:
   configuring the calibration units with a sequence; and
   causing each calibration unit to derive and transmit their GPS location and a time of transmission according to the sequence.

23. A method according to claim 22 further comprising configuring the calibration units to derive and transmit their GPS location and a time of transmission upon reception of a GPS location and time from a calibration unit immediately preceding the respective calibration unit in the sequence.

24. A method according to claim 18 further comprising:
   receiving the locations and status transmitted from the at least one sensor module at a base station; and
   causing a response to be initiated based on the status received at the base station.

* * * * *